Jan. 2, 1951  W. J. ALLAN  2,536,831
TEMPERATURE CONTROLLER
Filed Oct. 27, 1947  3 Sheets-Sheet 2
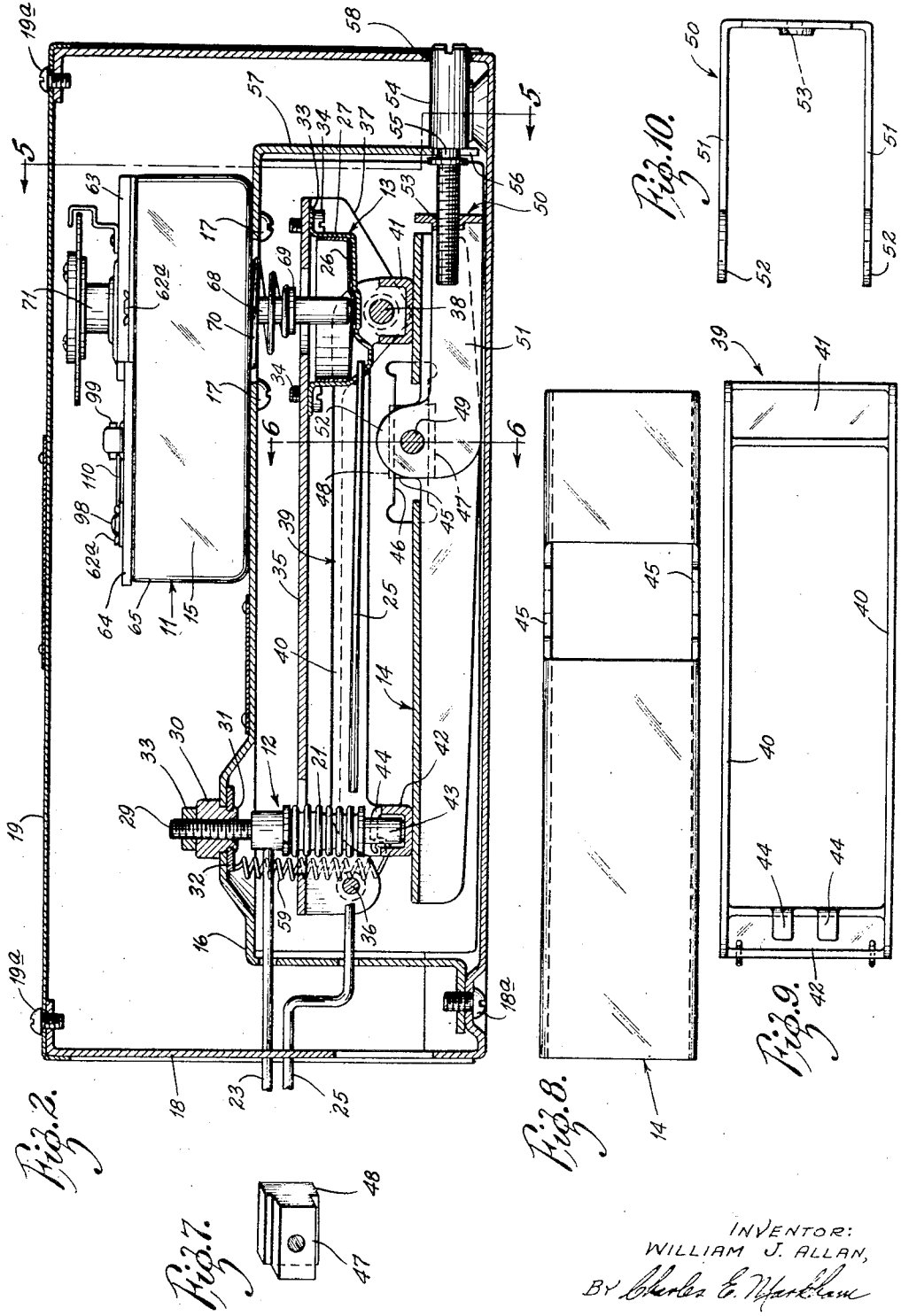
INVENTOR:
WILLIAM J. ALLAN,
BY Charles E. Markham
AGENT Jan. 2, 1951 W. J. ALLAN 2,536,831
TEMPERATURE CONTROLLER
Filed Oct. 27, 1947 3 Sheets-Sheet 3
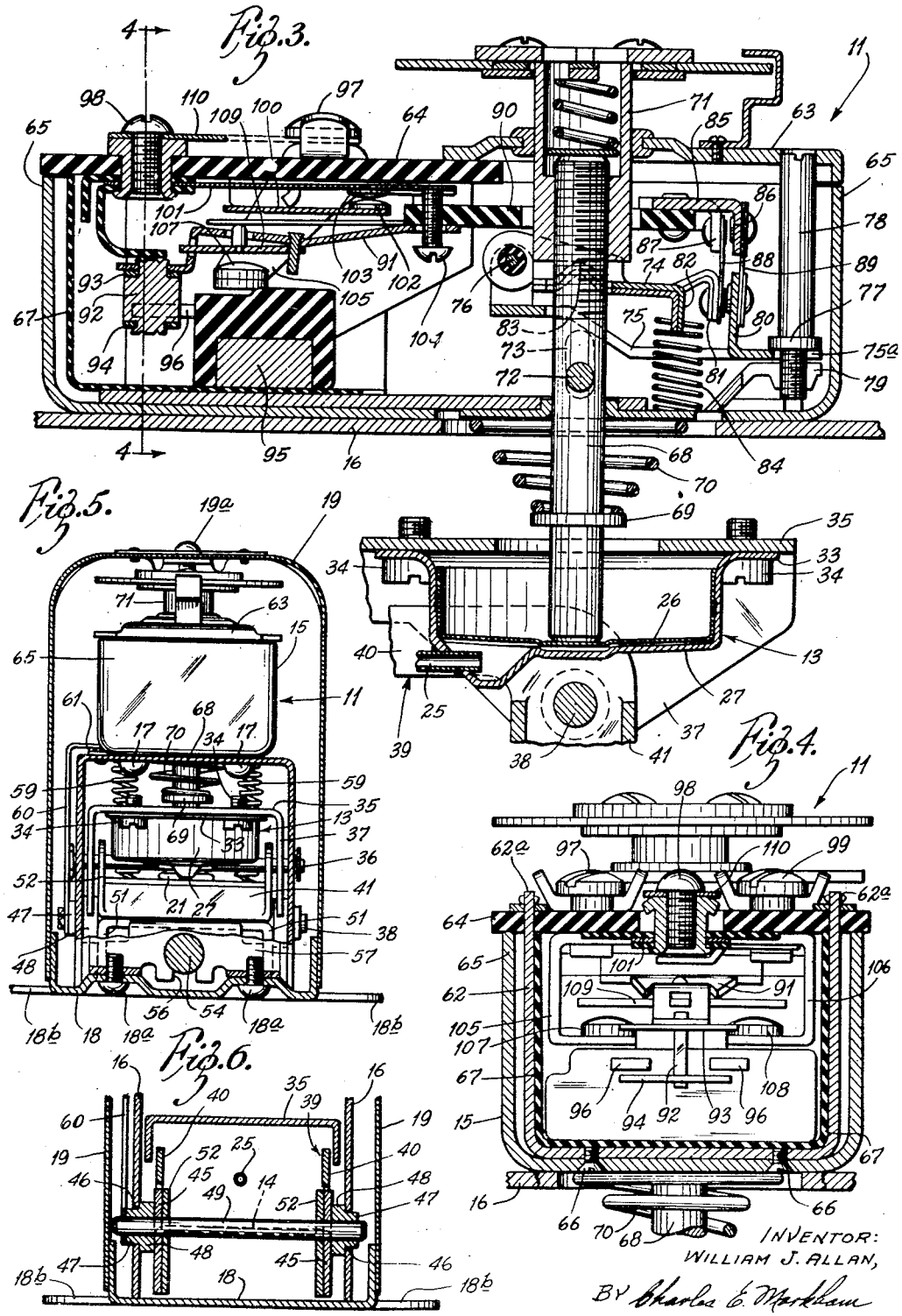
INVENTOR:
WILLIAM J. ALLAN,
BY Charles E. Markham
AGENT.

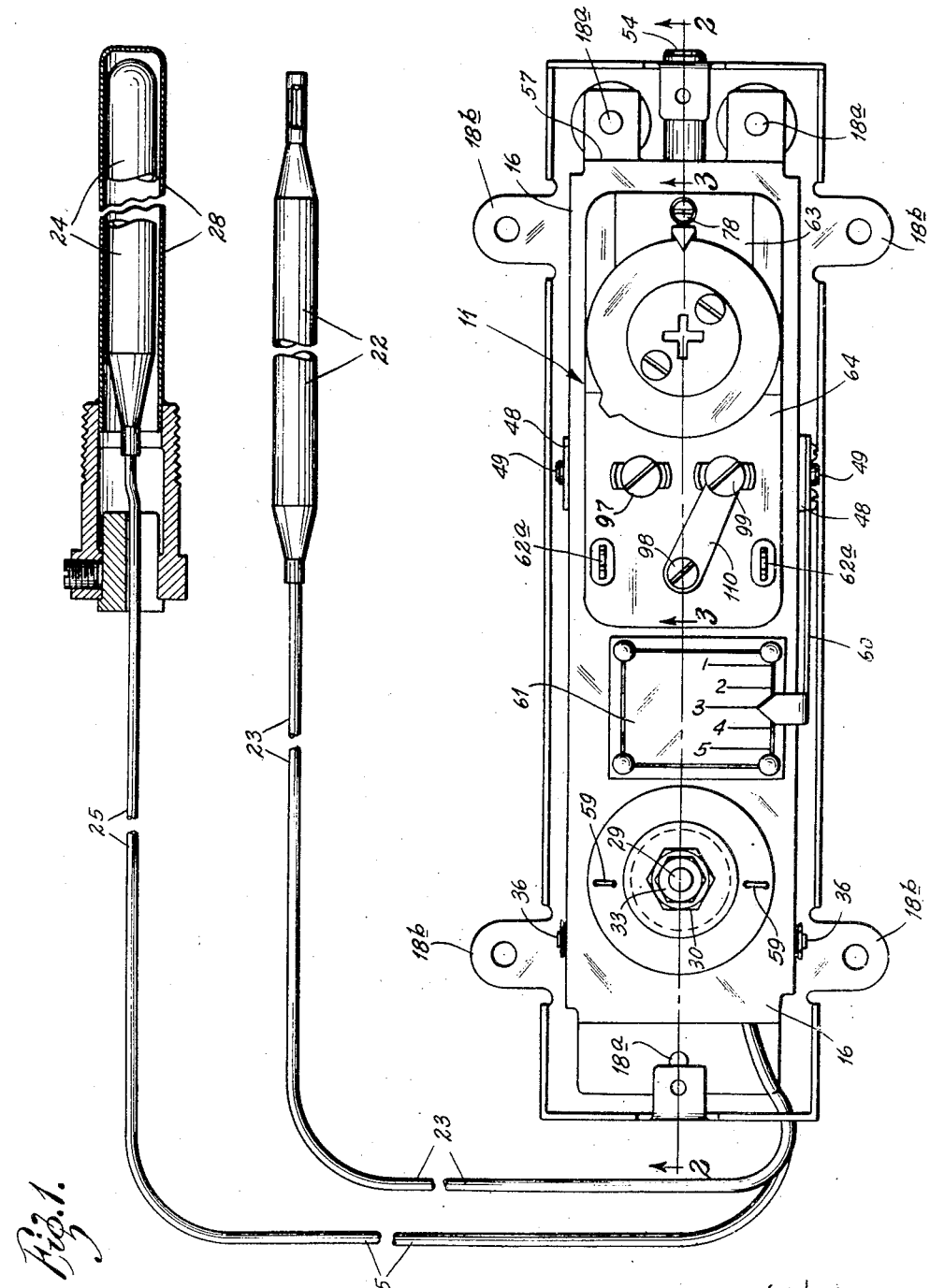

Patented Jan. 2, 1951

2,536,831

UNITED STATES PATENT OFFICE 2,536,831

TEMPERATURE CONTROLLER

William J. Allan, Richmond Heights, Mo., assignor to Missouri Automatic Control Corporation, St. Louis, Mo., a corporation of Missouri Application October 27, 1947, Serial No. 782,432

13 Claims. (Cl. 200—140)

This invention relates to temperature controllers, and particularly to controllers capable of controlling the amount of heat supplied to or removed from one body so as to vary its temperature in predetermined relationship with the varying temperature of a second body. This type of controller is widely used in space conditioning systems to control the condition change producing means so as to vary the temperature of the heating or cooling medium in predetermined relationship with variations in the outdoor air temperature in such a way that a constant selected temperature is maintained in the space to be conditioned.

It is an object of the present invention to provide a generally new and improved controller of this type, suitable for use in space conditioning systems, which is particularly sensitive and reliable in operation, in which the relationship between the controlled temperature of the conditioning medium and the outdoor air temperature at any point may be conveniently varied.

It is a further object of the present invention to provide a controller of this kind having a control member and a pair of temperature responsive actuators, one of which is sensitive to the outdoor air temperature and the other being sensitive to the temperature of the conditioning medium, in which the temperature responsive actuators and the control member are operatively connected in such a manner that the movement of one of the temperature responsive actuators is transmitted through the other temperature responsive actuator to the control member.

It is a further object to provide a controller as above in which the movements of one temperature responsive actuator is transmitted through the other temperature responsive actuator to the control member, and in which there is adjustable motion multiplication and transmission means between the temperature responsive actuators.

A further object is to provide a controller as above in which the movements of a first temperature responsive actuator are transmitted through a second temperature responsive actuator to a control member, in which there is adjustable multiplication and transmission means between the temperature responsive actuators, and in which there is motion multiplication and transmission means including an adjustable lost motion connection between the second temperature responsive actuator and the control member.

Other objects and advantages will appear from the following description and accompanying drawings.

In the drawings:

Fig. 1 is a top view of a controller constructed in accordance with the present invention. The cover has been removed in this view;

Fig. 2 is a longitudinal section of the controller shown in Fig. 1, taken on line 2—2 of Fig. 1;

Fig. 3 is an enlarged longitudinal section of the switching mechanism, which is enclosed in a separate casing, shown together with one of the temperature responsive actuators. The view is taken on line 3—3 of Fig. 1;

Fig. 4 is an enlarged transverse sectional view of the switching mechanism taken on line 4—4 of Fig. 3;

Fig. 5 is a transverse sectional view of the controller shown in Fig. 1 and is taken on line 5—5 of Fig. 2;

Fig. 6 is a transverse sectional view taken on line 6—6 of Fig. 2;

Fig. 7 is a detail view of the sliding pivot block;

Fig. 8 is a plan view of the adjustable motion transmission lever, which is the lower lever shown in Fig. 2;

Fig. 9 is a bottom view of the tie arm which maintains a fixed spacing of the temperature responsive actuators, this member is shown resting on the motion transmission lever in Fig. 2;

Fig. 10 is a plan view of the adjustment yoke shown in Fig. 2.

The controller includes as primary elements, switching mechanism generally indicated at 11, a temperature responsive actuator sensitive to the basic varying temperature (outdoor air temperature) generally indicated at 12, a temperature responsive actuator sensitive to the temperature of the conditioning medium generally indicated at 13, and a motion multiplying and transmission lever generally indicated at 14. The switching mechanism 11 is enclosed in an inner separate housing 15 which is supported on a frame member 16 and is attached thereto by the screws 17. The entire controller, with the exception of the temperature sensitive bulbs, is housed in a casing comprising a relatively heavy walled member 18 which forms the bottom and end walls, and a relatively light walled cover member 19 which forms the top and side walls. The frame 16 is attached to the heavier casing portion 18 by screws 18a and the light cover portion 19 is attached to portion 18 by the screws 19a. The heavy casing portion 18 is provided with perforated mounting lugs 18b.

Temperature sensitive actuator 12 comprises an expansible element 21, a temperature sensitive bulb 22 and a connecting capillary tube 23. The expansible element 21 is of a type widely used, consisting of a transversely corrugated tube which extends longitudinally under internal pressure. Temperature responsive actuator 13 comprises an expansible element, a temperature sensitive bulb 24, and a connecting capillary tube 25. The expansible element consists of an inner flexible cup member 26 and an outer rigid cup member 27. The capillary 25 communicates with the space between the bottom walls of the cup members and is connected to the outer rigid cup member by soldering or brazing. The bottom wall of the flexible cup member 26 moves upward at its center away from the bottom wall of the rigid cup member 27 upon an increase in pressure. The construction and operation of this type of expansible element is fully shown and described in the patent to L. M. Persons No. 2,203,841 issued June 11, 1940.

The bulbs, capillary tubes and expansible elements of both temperature responsive actuators are filled with a temperature sensitive fluid. The temperature sensitive bulb 24 is provided with a conventional casing 28 to facilitate mounting the bulb in a line or reservoir containing the space conditioning medium. The bulb 22 is suitably mounted so as to be sensitive to outdoor air temperature. Expansible element 21 is provided with a stud 29 at its upper fixed end which engages a nut 30. The nut 30 is mounted for rotation in the top of frame member 16 by riveting over as indicated at 31. A bearing washer 32 is also provided. By rotating the nut 30 the element may be adjusted upward or downward. A lock nut 33 is provided for locking the element in an adjusted position.

The outer rigid cup member 27 of the expansible element 13 is provided with a flange 33, through which pass attaching screws 34 for the rigid attachment of the element to the web portion, and at the outer free end, of a channel shaped pivoted arm 35. The arm 35 is mounted for rotation on a pivot 36 which passes thru its side flanges and which is supported in the side walls of the frame 16. The arm 35 is further provided with widened flange portions 37 at its free end which support a pivot 38 on which is rotatably mounted one end of a tie bar 39. The pivot 38 is located on the center line of expansible element 13. The pivoted tie bar 39 comprises a pair of spaced longitudinal side plates 40 which are connected at each end by transverse channel shaped members 41 and 42, see Fig. 9. At the free end of tie bar 39 the channel portion 42 receives between its flanges a cylindrical projection 43 provided on the lower free end of the expansible element 21 and thereby retains the lower end of this element at a fixed horizontal distance from expansible element 13. There is also a pair of spaced angularly formed flange projections 44 which prevent lateral movement of the lower end of the expansible element 21.

The tie bar 39 is somewhat narrower than the channel shaped arm 35 and freely fits between the flanges thereof. The end channel portions 41 and 42 of the tie bar bear at opposite ends on the web of the channel shaped multiplying lever 14. Lever 14 is provided intermediately with a pair of blanked out and turned up perforated ears 45. There are horizontal slots 46 in the opposite side walls of the frame 16 in which slide a pair of rectangular perforated sliding pivot blocks 47, see Figs. 2, 6 and 7. Blocks 47 have integral spacing flanges 48 which equally space the lever 14 from the frame. A pivot pin 49 passes thru the ears 45 of the lever 14 and the sliding blocks 47. The pivot is retained by the cover 19. It will be seen that by slidably moving the blocks 47 in the slots 46, and therefore the lever 14, the length of the lever arms between the pivot 49 and the expansible elements is varied. The reason for mounting the expansible element 13 on the pivoted arm 35, and providing the spacing tie bar 39 is to maintain the expansible elements in fixed relationship horizontally while permitting their vertical extension and contraction. The vertical movements of the expansible elements due to expansion and contraction is not sufficient to swing the outer ends of the relatively long members 35 and 39 through an arc great enough to affect their horizontal spacing.

There is a U-shaped adjusting yoke 50, see Fig. 10, the parallel legs 51 of which have perforated ears 52. Legs 51 are spaced so as to permit the open end of the yoke to just freely fit between the flanges and upturned ears 45 of the lever 14. The pivot pin 49 also passes thru the perforated ears 52. The connecting leg of the U-shaped yoke has a threaded perforation 53 which receives in threaded engagement the threaded end of an adjusting screw 54. The adjusting screw 54 is provided with an intermediate annular groove 55 which engages an open end slot 56 in the end panel 57 of the frame 16 at its lower edge. The outer end of the screw 54 projects slightly thru an opening 58 in the heavy casing member 18 and is slotted for a screw driver. As the screw 54 is rotated the yoke 50 moves the lever 14 and its pivot longitudinally to change the relationship of the pivot with respect to the expansible elements. There is a pair of element return springs 59 attached at one end to the outer free end of tie bar 39 and at their other ends to the top of the frame member 16. Attached to the left hand sliding block 47 in Fig. 6, is an upwardly extending indicator arm 60 having a point on the end thereof which overlays an indicia plate 61 mounted on the top of cover 19 and which indicates the position of the pivot in terms of the ratio of the arm lengths between the pivot 49 and the center lines of elements 21 and 13.

The housing which encloses the switching mechanism 11, includes an inner U-shaped frame member 62 to which are attached cover panels 63 and 64. The cover panels are attached to the frame member by the peening over of integral tongues 62a which project from the upper edges of the frame member and pass through rectangular perforations in the cover member, see Figs. 2 and 4. Cover panel 63 may be of metal, but panel 64 is of dielectric material. There is also a casing 65 which completes the enclosure and which is attached at the bottom to the frame 62 by countersunk head screws 66, see Fig. 4. Insulating panels 67 are provided to space the switching mechanism from the frame member.

The switching mechanism includes an adjustable actuating rod 68, the lower end of which projects thru openings in the bottom of the frame member 62 and the casing 65 and the frame 16 and bears on the flexible cup member 26 at its center, see Fig. 3. The rod 68 is provided with a collar 69. A return spring 70, which bears against collar 69 at one end and against the bottom of the frame 62 at its other end, urges the rod downward and opposes expansion of element 13. The upper end of rod 68 is threaded and engages an adjustment nut 71. There is a pin 72, transversely through the rod 68, which engages at both ends the slots 73 in the side walls of the frame member 62, to prevent turning of the rod when the adjustment nut is turned.

The switching mechanism further includes a primary lever 74 and a differential lever 75, both mounted for rotation on a pivot 76 which is supported in the side walls of the frame 62, see Fig. 3. The outer free end of lever 75 is forked at 75a and extends between a collar 77 on a differential adjusting screw 78 and a fixed stop 79 formed as a part of the frame member 62. Lever 75 is further provided with a right angularly formed portion 80 near its outer end. Primary lever 74 is also provided with angularly formed portions 81 and 82 and an intermediate raised portion 83 which contacts the lower end of nut 71. A spring 84 bearing at its lower end on the bottom of casing 65 and at its upper end against the primary lever 74 urges this lever in a counter clockwise direction.

There is a secondary lever 85 having right angularly formed portions 86 and 87 parallel to the angularly formed portions 80 and 81 of lever 75 and 74. These portions 80 and 86, and 81 and 87 respectively are connected by thin flexible strips 88 and 89. These thin strip connectors function as pivoted links and have the advantage of eliminating any lost motion incident to the necessary manufacturing tolerances in fitting and journaling pivot links. The lever 85 includes an intermediate portion 90 of insulating material and a relatively flexible outer free end portion 91. At its free end lever 85 carries an armature 92 having spaced portions 93 and 94 arranged to be attracted alternately by a permanent magnet 95 having portions 96 which project between the spaced armature portions.

Attached to the insulating cover panel 63 are connector posts 97, 98 and 99, see Figs. 1 and 3. Posts 97 and 98 have attached thereto flexible switch blades 100 and 101 respectively. These flexible switch blades carry contacts 102 and 103 respectively. When contacts 102 and 103 are closed, a temporary, or pilot circuit is closed between posts 97 and 98. There is a screw 104 carried in the portion 90 of lever 85 which bears against the outer end of the switch blade 101 and which separates contacts 102 and 103 as lever 85 is rotated clockwise about its connection with the differential lever 75. Connector posts 97 and 99 have connected thereto rigid contact arms 105 and 106 which carry contacts 107 and 108. A contact bar 109 loosely mounted on the outer free end of lever 85 completes circuit between the posts 97 and 99 as the arm 85 rotates counter clockwise. Connector posts 98 and 99 are connected by a removable conductor bar 110, see Fig. 1.

The arrangement is such that as lever 85 is rotated counter clockwise, the screw 104 moves away from the switch blade 101 first, permitting the flexibly mounted contacts 102 and 103 to close completing a pilot circuit between posts 97 and 98. Posts 98 and 99, being connected by the conductor 110, the circuit is therefore completed between the posts 97 and 99. As the arm continues to rotate counter clockwise the loosely carried contact bar 109 bridges the contacts 107 and 108 and completes a load carrying parallel between posts 97 and 99. The resiliently mounted contacts 102 and 103 provide for a non-bouncing and therefore a non-arcing closure of the circuit when the device is used with alternating current and the load is immediately transferred, almost instantaneously, through the heavier contacts, arms and contact bar. By providing the third connector post 98, convenient interchangeable use with alternating or direct current is effected. When using the device to control direct current circuits the conductor bar 110 may be conveniently removed in the field, thus rendering the pilot circuit ineffective.

*Operation*

Assuming the device is to be used in a heating system to vary the temperature of the heating medium in predetermined relationship with the varying outdoor air temperature, and that circuit connections for an electrically operated heat producer are made at connector posts 97 and 99. The bulb 25, which is connected to expansible element 13, will be mounted so as to be sensitive to the temperature of the heating medium, and the bulb 22 connected to the element 21, will be mounted so as to be sensitive to the outdoor air temperature.

The device is shown in a circuit breaking position, a position which it assumes when the temperature of the medium has been heated to the temperature selected for the instant outdoor air temperature. Assuming that the outdoor air temperature remains constant, then as the temperature of the heating medium drops below this temperature the element 13 will contract and actuating rod 68 will be moved downward by spring 70. As the rod 68 moves downward lever 74 will be rotated in a clockwise direction due to its contact with nut 71 at 83. As the outer end of lever 74 moves downward the outer end of differential lever 75 will also be moved downward slightly until it rests on the fixed abutment 79. As the lever 74 continues to rotate in a clockwise direction it will rotate secondary lever 85 in a counter clockwise direction about its connection with the outer end of lever 75 thereby permitting the pilot contacts 102 and 103 to close first, and will then move the bar 109 into position to bridge the contacts 107 and 108. The magnet 96 resists this rotation, to the extent that the outer portion 91 of the arm is slightly flexed and therefore, as the attraction of the magnet is overcome, a snap action at the outer end of the lever is effected. The closing of the flexibly mounted non-bouncing contacts 102 and 103, and the closing of the load carrying contacts 107 and 108 is therefore, almost simultaneous. It will be understood that spring 70 is considerably stronger than spring 84 and therefore readily overcomes it as the element 13 contracts.

With the circuit for the heat producer completed, the temperature of the medium again rises resulting in the expansion of element 13. As the element expands against spring 69 compressing it, the spring 84 will rotate lever 74 counter clockwise. The initial part of this rotation will carry the outer end of differential lever 75 upward into contact with the collar 77 and thereafter, further rotation will rotate the lever 85 in a clockwise direction breaking the circuit at both sets of contacts. With the outdoor air temperature constant the device will continue to cycle thus. The length of the off and on cycles of the heat producer will depend upon how close it is desired that the temperature of the medium be held to the selected mean. It will be noted that an initial portion of the movement of the expansible element in either direction is lost, as the end of differential lever 76 is moved between its abutments, during opening and closing movements. As the distance between these abutments is increased, by turning adjustment screw 78, the operating differential will be increased, the length of the operating cycles will increase, and the temperature variation in the medium will increase. The reverse of course will result as the abutments are adjusted more closely together.

If the temperature of the outdoor air increases, it will result in the expansion of element 21, the counter clockwise rotation of lever 14, and the upward movement of expansible element 13. This upward movement of the element will result in the circuit being broken at a lower medium temperature whereby a lower medium temperature will thereafter be maintained with the increased outdoor air temperature. If the outdoor air temperature decreases element 21 will contract allowing spring 70 to move element 13 downward therefore requiring its greater expansion, and therefore a higher temperature of the medium, to effect a breaking of the circuit, whereby a higher medium temperature will be maintained thereafter for the decreased outdoor air temperature. It will be seen therefore, that the controlled temperature of the medium is varied inversely with the temperature of the outdoor air.

Adjustments

The ratio of the controlled temperature of the medium to the temperature of the outdoor air at any point may be conveniently selected by rotating the adjustment nut 71. It will be seen that as the nut 71 is screwed downward on rod 68, it will rotate arm 74 in a clockwise direction, and that the circuit will, as a result, close earlier as the element 13 contracts due to decreasing medium temperature. A higher medium temperature will thereby be maintained for any outdoor air temperature throughout the range. The opposite results as the screw is adjusted upward.

The rate at which this selected ratio changes with changes in outdoor air temperature is determined by the relationship of the arm length between pivot 49 and the expansible elements. In order to vary the rate at which the ratio changes with outdoor air temperature changes, the lever 14 and pivot 49 are shifted with relation to the expansible elements by turning the adjustment screw 58. As the lever and pivot are shifted to the left, in Fig. 2, the differential in the arm lengths is decreased and the rate of change in temperature ratios is decreased, and conversely as the lever and pivot are shifted to the right the rate of change in temperature ratios is increased.

The various details of this invention may be modified without departing from the principle, and it is not the intention that the invention be limited to the particular use or embodiment illustrated and described herein, but includes such modifications thereof which lie within the scope of the appended claims.

I claim:

1. In a temperature responsive control device of the class described a pivoted lever, spring returned switching mechanism having an operating member adjacent said lever at a first point, a temperature responsive actuator responsive to the temperature of one body and having means for engaging said lever at a second point spaced from said first point and arranged to move said lever toward said operating member so as to operate said switch mechanism in one direction in response to an increase in temperature, a floating thermally expansible element responsive to the temperature of a second body and biased between said operating member and said lever for jointly causing the operation of said switching mechanism in the same direction in response to an increase in temperature and means for shifting said lever pivot relative to said first and second lever points.

2. In a temperature responsive control device the combination of a pivoted lever, a control member movable oppositely between two positions, spring means normally biasing said control member in one position, means for releasably holding said control member in both positions, a control operating member adjacent said lever, means providing adjustable lost motion between said operating member and said control member, a floating thermally expansible element biased between said operating member and said lever, a temperature responsive device operatively connected to said lever at a point spaced from said expansible element, and means for varying the position of said lever pivot with relation to said temperature responsive device.

3. In a device of the kind described, an intermediately pivoted lever, control mechanism having an operating member adjacent one end of said lever, a pair of temperature responsive actuators acting on said lever on the same side thereof and on opposite sides of its pivot so as to oppose each other in response to an increase in the temperatures to which they are sensitive, one of said actuators being extensible in response to an increase in temperature and being biased between said lever and said control operating member, and means for varying the ratio of the lever arms between said actuators and lever pivot.

4. In a temperature responsive control device, a control member movable oppositely to first and second positions, spring means normally biasing said control member in a first position, means for releasably holding said control member in both positions, a control operating member, means providing adjustable lost motion between said operating member and said control member, a pair of series connected temperature responsive actuators having an operative connection with said operating member and arranged to act conjointly in response to an increase in the temperatures affecting them to move said control member to its second position, and variable motion transmission means interposed between said temperature responsive actuators.

5. In a temperature responsive control device of the class described in combination a frame member, a lever pivotally supported intermediately of its length in said frame member, spring pressed switching mechanism supported by said frame member and having an operating member adjacent one end of said lever, a pair of temperature responsive actuators each comprising a remote temperature sensitive bulb, an expansible element, and a connecting capillary tube, and each being filled with a thermally expansible fluid, one of said actuators having its expansible element biased between said lever and said switch operating member, the other of said actuators having its expansible element biased between said lever and said frame member on the same side of said lever and on the other side of said pivot, said actuators thereby being arranged to act oppositely upon said lever and conjointly with respect to said switch operating member in response to an increase in the temperatures to which they are sensitive, and means for shifting said lever pivot with relation to said expansible elements.

6. In a temperature control device in combination a frame member, a lever pivotally supported intermediately of its length in said frame member, spring pressed switching mechanism supported by said frame member and having an operating member adjacent one end of said lever, a first temperature responsive actuator including a thermally expansible element biased between said operating member and said lever on one side of its pivot, a second temperature responsive actuator engaging said lever at a point on the other side of the pivot and on the same side of said lever, said temperature responsive actuators thereby being arranged to act oppositely on said lever and in series with respect to said switch operating lever in response to an increase in the temperatures affecting them and means for shifting said lever pivot with relation to said temperature responsive actuators.

7. In a temperature responsive control device the combination of a pivoted lever, a control member movable oppositely between two positions, spring means normally biasing said control member in one position, means for releasably holding said control member in both positions, a control operating member adjacent said lever, means forming an adjustable operating connection between said operating member and said control member, means providing adjustable lost motion between said operating member and said control member, a floating thermally expansible element biased between said operating member and said lever at one point, a fixed temperature responsive actuator engaging said lever at a spaced point, and means for shifting the pivot point of said lever with relation to said temperature responsive actuator.

8. In a temperature responsive control device of the class described, a frame member, a first lever, a pivot for said lever mounted for slidable adjustment in said frame member in a direction substantially parallel to said lever, a control member having a spring returned operating element adjacent said lever at one point, a first floating thermally expansible element biased between said lever and said control element, a second thermally expansible operating element fixed to said frame member and operatively engaging said lever at a spaced point and on the same side thereof, and a second lever lying substantially parallel with said first lever and being pivotally connected at one end to said frame member, said first expansible element being connected to the other end of said second lever whereby said first expansible element is free to move in a path substantially perpendicular to said first lever but is restrained from movement longitudinally thereof.

9. In a temperature responsive control a device of the class described, a frame member, a first lever, an intermediate transverse pivot carried in said first lever, and mounted for slidable adjustment in said frame member in a direction substantially parallel with said lever, a control member having a spring returned operating element adjacent said lever on one side thereof and on one side of said pivot, a first thermally expansible element biased between said lever and said control operating element, a second elongated thermally expansible element having one end fixed to said frame member and having its free end engaging said lever on the same side thereof and on the opposite side of said pivot, a second lever lying substantially parallel with said first lever and being pivotally connected at one end to said frame member, said first expansible element being connected to and movable with the opposite free end of said second lever, and an element spacing member lying substantially horizontal with said levers having a pivoted connection with the free end of said second lever at one end and having a connection with the free end of said second expansible element at its other end, whereby said first expansible element and the free end of said second expansible element are free to move independently in a direction substantially perpendicular to said first lever but are restrained from movement longitudinally therewith as said first lever and its pivot are adjustably positioned.

10. In a temperature responsive device of the class described, a frame member, a lever having a relatively wide flat surface extending longitudinally thereof, a transverse pivot carried in said lever, control means operated by the rotation of said lever, at least one sliding block member receiving said pivot for rotation therein and being slidably mounted in said frame member suchwise that said lever and pivot may be shifted in a direction substantially longitudinally of said lever, means for shifting said pivot and lever, a plurality of temperature responsive elements arranged to operatively engage said lever at spaced points thereon, a follower shoe member between each of said elements and said lever each having an extensive flat surface engaging said flat lever surface, and means for pivotally connecting said shoe members to said frame member suchwise that said shoe members are free to swing in a path substantially perpendicular to said lever.

11. In a temperature control instrument for automatically controlling the temperature of a first body so as to maintain its temperature in preselected relationship with the varying temperature of a second body; the instrument comprising a frame member, a control member supported by said frame member, a pair of temperature responsive actuators, one of which is responsive to temperature variations in a first body and the other of which is responsive to temperature variations in the second body, said actuators being operatively connected in series and arranged to react between said frame member and said control member in such manner as to conjointly actuate said control member in one direction in response to a unidirectional change in the temperatures affecting them, and variable motion multiplying means between said actuators for independently varying the multiplication of the movements of said actuator most remote from said control member.

12. In a temperature control instrument for automatically controlling the temperature of a temperature conditioned body so as to maintain its temperature in preselected relationship with the varying temperature of the outdoor atmosphere; the instrument comprising a frame member, a control member supported by said frame member, a first temperature responsive actuator supported by said frame member at a point spaced from said control member and being responsive to outdoor temperature variations, a second temperature responsive actuator operatively connected in series with said first actuator and being responsive to temperature variations of the conditioned body, said second actuator being operatively associated with said control member, said actuators being arranged to act conjointly in response to a temperature change in the same direction to actuate said control member in one direction, and variable motion multiplying means between said actuators for independently varying the multiplication of the movements of said first temperature responsive actuator.

13. In a temperature control instrument for automatically controlling the temperature of a temperature conditioned body so as to maintain its temperature in preselected relationship with the varying temperature of the outdoor atmosphere; the instrument comprising a switching device, a first temperature responsive actuator responsive to a change in temperature of the outdoor air in one direction to actuate said switch in one direction, variable motion multiplying means between said first actuator and said switch, a second temperature responsive actuator responsive to a temperature change of the conditioned body in the same direction to conjointly actuate said switch in the same direction, said second temperature responsive actuator having a direct operative connection with said switch, whereby the movements of said first actuator may be variably multiplied independently of the second actuator.

WILLIAM J. ALLAN.

REFERENCES CITED

The following references are of record in the file of this patent:

UNITED STATES PATENTS

| Number | Name | Date |
|---|---|---|
| 1,736,979 | Mottlau | Nov. 26, 1929 |
| 2,297,706 | Jehle et al. | Oct. 6, 1942 |
| 2,431,801 | Gibson | Dec. 2, 1947 |